United States Patent [19]

Hodge

[11] 3,925,423
[45] Dec. 9, 1975

[54] RESORCYCLIC ACID LACTONES AND THEIR PRODUCTION

[75] Inventor: Edward B. Hodge, Terre Haute, Ind.

[73] Assignee: Commercial Solvents Corporation, Terre Haute, Ind.

[22] Filed: Jan. 22, 1974

[21] Appl. No.: 435,497

[52] U.S. Cl............. 260/343.2 F; 99/2 G; 204/158
[51] Int. Cl.² ....................................... C07D 313/00
[58] Field of Search............................ 260/343.2 F

[56] References Cited
UNITED STATES PATENTS

| | | | |
|---|---|---|---|
| 3,373,030 | 3/1968 | Hodge et al. | 260/343.2 |
| 3,551,454 | 12/1970 | Taub et al. | 260/343.2 |
| 3,810,918 | 5/1974 | Urry et al. | 260/343.2 |
| 3,836,544 | 9/1974 | Urry et al. | 260/343.2 |

Primary Examiner—James A. Patten
Attorney, Agent, or Firm—Morton, Bernard, Brown, Roberts & Sutherland

[57] ABSTRACT

New resorcyclic acid lactone derivatives which may be represented by the formula

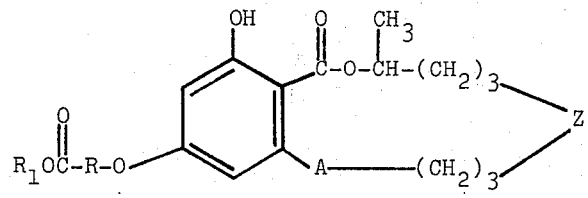

wherein A is either $CH_2-CH_2$ or $CH=CH$, $>Z$ is $>C=O$, $>CH-OH$ or $>CH_2$, and $R_1$ is hydrogen, alkyl, alkanoyl, aryl or aryl alkyl, and R is lower alkylene, are useful as animal growth promoters. The compounds may be prepared by reacting a resorcyclic acid lactone derivative with a compound of the formula

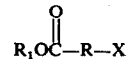

wherein X is halogen, in the presence of an alkali metal base.

11 Claims, No Drawings

RESORCYCLIC ACID LACTONES AND THEIR PRODUCTION

This invention relates to novel organic compounds having animal growth promoting properties, and a method of preparing them.

Compounds of the present invention, hereinafter referred to as the "C-compounds," which are useful as animal growth promoters, may be represented by the formula

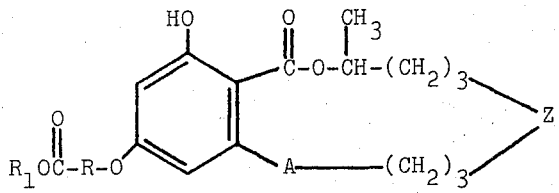

wherein A is either —CH₂—CH₂— or —CH=CH—, >Z is >C=O, >CHOH or >CH₂, and $R_1$ is selected from the group of hydrogen, and substituted or unsubstituted alkyl, alkanoyl, aryl and aryl alkyl. The alkyl group may contain, by way of example, from 1 to about 15 carbon atoms, and, for instance, are lower alkyl such as methyl, ethyl, hexyl and the like, and cycloalkyl, particularly monocyclic cycloalkyl of 5 to 8 carbon atoms, such as cyclopentyl, cyclohexyl, methyl cyclohexyl, etc. The alkanoyl groups generally contain 1 to about 25 or more carbon atoms, for instance, lower alkanoyls such as acetyl, propionyl, valeryl, etc. The aryl groups contemplated include, for example, monocyclic aryl containing 6 to 10 carbon atoms or more, such as phenyl, tolyl, etc. The arylalkyls (i.e., an alkyl group with an aryl substituent thereon) include, for example, groups in which the aryl substituent may be monocyclic aryl containing 6 to 10 carbon atoms or more and the alkyl group is generally a lower alkyl; examples of aryl alkyls include benzyl, bromobenzyl, tolyl methyl, etc. R is lower alkylene preferably a lower alkylene of 1 to about 6 carbon atoms, and may be, for instance,

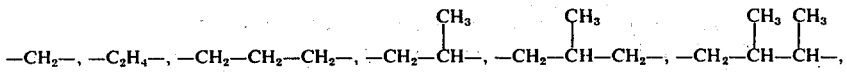

and the like.

The C-compounds can be prepared by reacting a resorcylic acid lactone of the formula (formula "I")

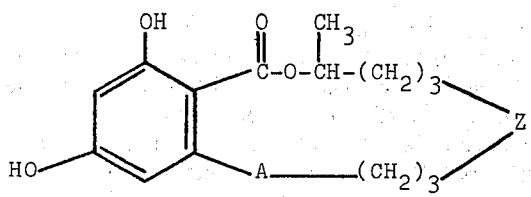

with a halogen-compound of the formula (formula "II")

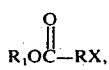

wherein R, $R_1$, A, and Z, are as defined above, and X is halogen, preferably chlorine or bromine. Suitable examples of halogen compounds include ethyl bromo acetate and ethyl chloro acetate. The reaction is conducted in the presence of an alkali metal base, for instance sodium hydroxide. sodium carbonate, potassium hydroxide, and potassium carbonate, and at elevated temperatures, for instance, about 50° to 200°C., preferably under refluxing conditions. The pressure employed during the reaction may be about 0.5 to 50 atmospheres absolute or more; however, conveniently ambient pressure is employed. The reaction is preferably conducted in an aprotic solvent medium, for instance, acetone, dimethylsulfoxide, and the product may conveniently be recovered by cooling the reaction mixture and filtering it and then adding water to produce a solid product. The product may be purified by any convenient means, for instance, by recrystallization from isopropyl alcohol or from a mixture of ethanol and water.

Generally, the mole ratio of resorcylic acid lactone derivative and the halogen-containing compound is in the range of about 5:1 to 1:10. Preferably, the halo-containing compound is provided in excess of that required on a stoichiometric basis for the reaction, e.g., about 1.2 to 5 moles of the halogen-containing compound per mole of the resorcylic acid derivative. The alkali metal base is provided in an amount in excess of that required on a stoichiometrical basis for combination with the halogen, e.g., bromine ion evolved during the reaction. Frequently, the alkali metal base is provided in an amount of about 1 to 10 moles per mole of halo-containing compound. The solvent is provided in solvent-providing quantities, frequently about 5 or 10 to 200 or more ml. per gram of the resorcylic acid lactone derivative.

The halogen-containing compounds and the resorcyclic acid lactones employed in making the C-compounds can be prepared by known methods. The resorcylic acid lactone derivatives include trans-zearalenone, and include compounds which can be prepared, for instance, from trans-zearalenone. Trans-zearalenone can be obtained by the cultivation of the microorganism *Gibberella zeae* (Gordon) and a suitable fermentation medium, as described, for example in U.S. Pat. No. 3,196,019. By way of example, the unsaturated carbon bond in the lactone zearalenone ring can be hydrogenated according to the procedure of U.S. Pat. No. 3,239,354. The ketone group of zearalenone may be converted to >CHOH by the procedure disclosed in U.S. Pat. No. 3,239,341. The keto group of zearalenone may be converted to >CH₂ by the procedure disclosed in U.S. Pat. No. 3,237,341. Replacement of the hydrogen of the hydroxy groups of the resorcylic acid lactone derivative with an alkyl, alkanol, aryl, or arylalkyl group is disclosed in U.S. Pat. Nos. 3,239,342; 3,239,347; and the above-mentioned patents.

Resorcylic acid lactone prepared from trans-zearalenone as well as trans-zearalenone may be converted to the corresponding cis-configuration by the electromagnetic irradiation of the trans-isomer in the 2800–3500 Angstrom wavelength range, as disclosed in U.S. patent application Ser. No. 317,117, filed Dec. 21, 1972, now abandoned. Trans-zearalenone, as obtained by fermentation according to U.S. Pat. No. 3,196,019, is an S conformer. Resorcylic acid lactone derivatives wherein >Z is >CHOH can, and do, exist in two different diasteroisomeric arrangements based on the substitutions on the >Z carbon atom. Diastereoisomers, or "diamers" as they are commonly called, are stereoisomers which are not enantiomorphs (i.e., are not mirror images). These diamers have different melting points and, for that reason, can be distinguished as the low melting dimer of the high melting dimer. Separation of the diastereoisomers of zearalanol is disclosed in U.S. Pat. No. 3,687,982.

The compounds of the present invention may be used as animal growth promoters. They may be administered orally or parenterally to male, female or neutered cattle, sheep, goats, pigs, chickens and other animals. Parenteral administration may be by intraperitoneal injection, intramuscular injection, subcutaneous implant, and the like. The amount of compound administered varies upon the kind of animal, its size, the growth rate desired, the feed and other related factors. The preferred range of administration is 0.1 to 50 milligrams per head per day, but may range up to 200 milligrams per head per day. When implanted, about 0.5 of these amounts are generally used.

Oral administration of the compound may be effected with a suitable, pharmaceutically-acceptable carrier, for instance, in a mixture with ordinary feed containing sufficient C-compound or mixture of several C-compounds to attain the desired growth rate. Typically, 2.5 to 50 grams of the compound are added per ton of feed.

Setting forth in more detail the use of compounds of this invention in feeds, a feed composition may be prepared containing the customary nutritionally balanced quantities of carbohydrates, proteins, vitamins and minerals, and, in addition, the compound. Ground grains and grain by-products, animal protein substances, such as fish meal, vegetable protein substances, such as soybean oil meal, vitamin-rich materials, such as riboflavin supplements, and bone meal and limestone, which provide minerals, are typical sources of dietary elements.

For parenteral administration, the C-compound or compounds may be suspended or dissolved in a pharmaceutically-acceptable carrier, for instance, a liquid medium such as peanut oil. One mode of parenteral injection includes inserting a cylindrical or ball-shaped implant containing the C-compound or compounds under the skin on the ear of the animal. Such implants typically contain 1 to 100 milligrams of the C-compound of this invention. Other modes of parenteral injection include, for example, intramuscular and intraperitoneal injection.

Compounds of the present invention have limited uterotropic activity. Inasmuch as uterotropic activity is often not a desired effect in promoting the growth of animals and is suspected of causing some diabilities or diseases, its absence is a desirable and useful property.

The following examples further illustrate the invention. All parts and percentages are by weight unless otherwise indicated.

EXAMPLE I

A mixture of 100 cc. of acetone, 50 grams of potassium carbonate (K₂CO₃. 1½ H₂O), 3.0 grams of zearalenone, and 2 ml. of ethyl bromoacetate is refluxed for 4 hours, then cooled and filtered. The filtrate is then mixed with 75 ml. of water which produces a solid product. This product is isolated, crystallized from a mixture of 30 ml. of isopropyl alcohol plus 15 ml. of water, and then crystallized from a mixture of 30 ml. of ethanol plus 15 ml. of water to yield 2.34 grams of 4-carboethoxymethyl ether of zearalenone, which exhibits a melting point of 82° to 85°C. The structure of this new compound may be represented by the following structural formula:

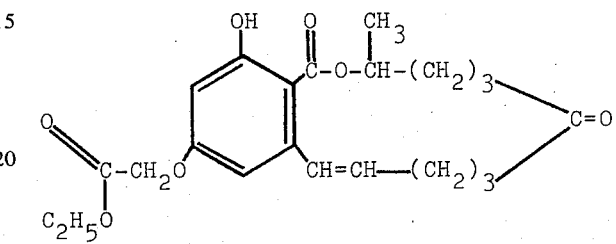

EXAMPLE II

This example illustrates the use of 4-carboethoxymethyl ether of zearalenone as a growth promoting supplement in animal feed. A daily ration of about 10 milligrams per head per day of 4-carboethoxymethyl ether of zearalenone, intimately admixed in about 20 pounds per head per day of a complete pelleted ration, is fed ab initio to six young steers for about 180 days. The complete pelleted ration includes, in addition to 4-carboethoxymethyl ether of zearalenone, the following:

| Corn | approx. | wt. | % | 40.00 |
|---|---|---|---|---|
| Molasses dried beet pulp | " | " | " | 35.00 |
| Alfalfa pellets | " | " | " | 8.00 |
| Tallow | " | " | " | 2.50 |
| Calcium carbonate | " | " | " | .30 |
| Urea | " | " | " | .30 |
| Phosphorus source | " | " | " | .40 |
| Salt | " | " | " | .50 |
| Molasses | " | " | " | 10.00 |
| Trace mineral | " | " | " | .50 |
| Vitamin A | MMI.U/ton | | | 2–4 |

The steers exhibit increased growth rate over a control group of similar steers fed ab initio the same pelleted ration, but without a C-compound.

EXAMPLE III

About 3 milligrams per day per head of 4-carboethoxymethyl ether of zearalenone, intimately admixed in about 1½ to 5½ pounds per head per day of a "grower" ration, is fed to six young swine of both male and female sexes to provide increased growth weight until they weigh between 90 and 125 pounds. The feed is altered to a finished ration, and the amount of C-compound is increased to provide each animal 30 milligrams per day of the C-compound in about 5½ to 10 pounds per head per day of ration until each swine reaches market weight, about 220 pounds. The grower and finisher rations include, in addition to the 4-carboethoxymethyl ether of zearalenone, the following:

| Ingredients | Grower, approx. wt. percent | Finisher, approx. wt. percent |
|---|---|---|
| Ground Yellow Corn | 77 | 86.7 |
| Soybean Meal (44% protein) | 16 | 6.5 |
| Meat and Bone Scraps (50% protein) | 2.5 | 2.5 |
| Dehydrate Alfalfa Meal (17%) | 2.5 | 2.5 |
| Steamed Bone Meal | 0.5 | 0.5 |
| Ground Limestone | 0.5 | 0.3 |
| Iodized Salt | 0.5 | 0.5 |
| Vitamin, Antibiotic and Trace Mineral Premix | 0.5 | 0.5 |

EXAMPLE IV

This example illustrates the absence of uterotropic activity of 4-carboethoxymethyl ether of zearalenone. Samples of 4-carboethoxymethyl ether of zearalenone compound are tested for uterotropic activity according to a well known uterine test using mice. The test comprises feeding the test material in admixture with a standard feed, to eight, adult, ovariectomized female mice for a 5-day period. The ratio of 4-carboethoxymethyl ether of zearalenone to feed is 25 micrograms/gram. On day 6, the animals may be weighed and sacrificed, and their uteri removed and weighed. Absence of uterotropic and estrogenic activity is confirmed by the uteri accounting for no significantly greater percentage of the test mice's body weight than the uteri of control mice.

EXAMPLES V TO IX

The procedure of Example I is essentially repeated except employing as reactants, a resorcylic acid lactone derivative of the formula

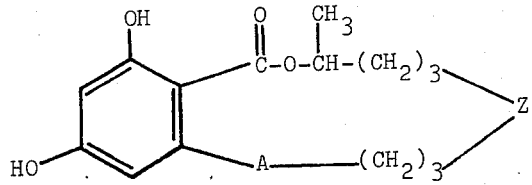

and a bromo-containing compound of the formula

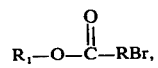

to provide a compound of the formula

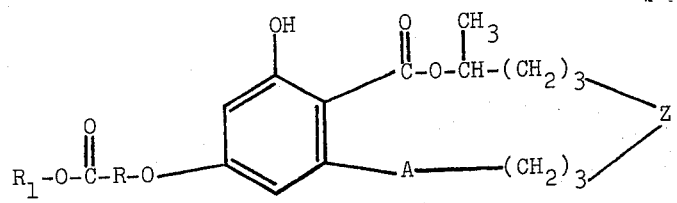

wherein values of R, $R_1$, A and Z are provided in the following table:

| Ex | R | $R_1$ | A | Z |
|---|---|---|---|---|
| V* | —$CH_2$— | $CH_3$— | —CH=CH— | C=O |
| VI*** | —$CH_2$—$CH_2$— | $CH_3$— | —$CH_2$—$CH_2$— | CHOH |
| VII | —$CH_2$—$CH_2$— | $CH_3$—$CH_2$— | —$CH_2$—$CH_2$— | $CH_2$ |
| VIII** | —$CH_2$— | $(CH_3)_2CH_2$— | —$CH_2$—$CH_2$— | CHOH |
| IX | —$CH_2$— | $CH_3$—$CH_2$ | —CH=CH— | C=O |

*cis isomer
**R conformer, corresponds to the high melting diastereoisomer
***corresponds to the low melting diastereoisomer.

EXAMPLES X TO XIV

The procedure of Example III is essentially repeated except employing the C-compounds which are provided in accordance with Examples V to IX to provide increased growth rate.

I claim:
1. A compound of the formula:

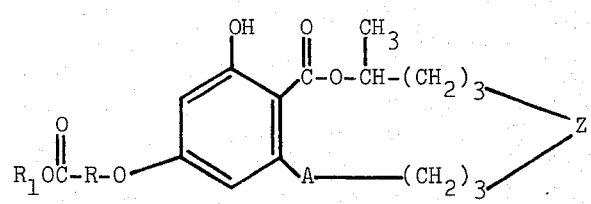

wherein —A— is either —$CH_2$—$CH_2$— or —CH=CH—, >Z is either >$CH_2$, >C=O or >CH—OH, R is lower alkylene, and $R_1$ is lower alkyl.

2. The compound of claim 1 wherein >Z is >C=O.
3. The compound of claim 2 wherein —A— is —CH=CH—.
4. The compound of claim 3 wherein R is —$CH_2$—.
5. The compound of claim 4 wherein $R_1$ is ethyl.
6. The compound of claim 1 wherein R is alkylene of 1 to 6 carbon atoms.
7. A process for making "C" compounds of the formula

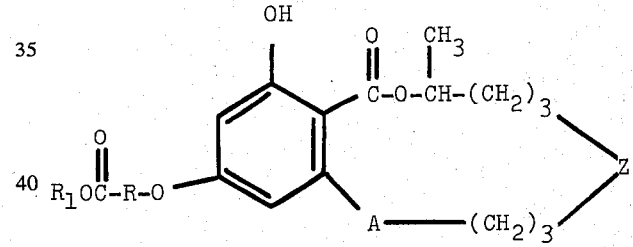

wherein —A— is either —$CH_2$—$CH_2$— or —CH=CH—, >Z is either >$CH_2$, >C=O or >CH—OH, R is lower alkylene, and $R_1$ is lower alkyl which comprises reacting a compound of the formula

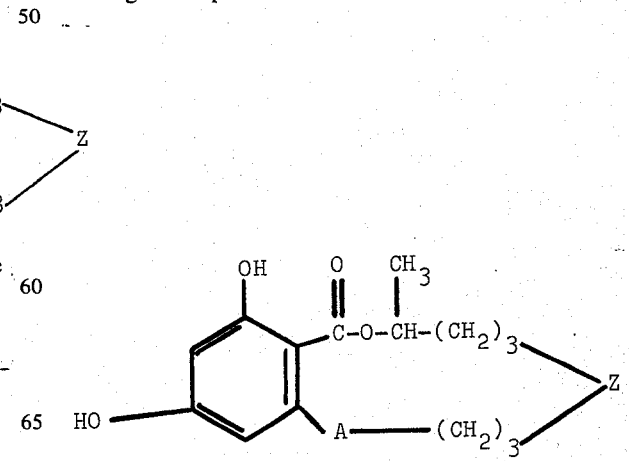

wherein A and Z are defined above with a halogen compound of the formula

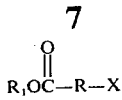

wherein R and $R_1$ are defined above and X is chlorine or bromine, in the presence of an alkali metal base at a temperature from about 50° to 200°C. to produce C compounds.

8. The process of claim 7 wherein X is bromine and the reaction is conducted by refluxing the reactants.

9. The process of claim 8 wherein A is —CH=CH—, and Z is >C=O.

10. The process of claim 9 wherein R is —$CH_2$— and $R_1$ is ethyl.

11. The method of claim 7 wherein R is alkylene of 1 to 6 carbon atoms.

* * * * *

UNITED STATES PATENT AND TRADEMARK OFFICE
CERTIFICATE OF CORRECTION

PATENT NO. : 3,925,423
DATED : December 9, 1975
INVENTOR(S) : EDWARD B. HODGE

It is certified that error appears in the above-identified patent and that said Letters Patent are hereby corrected as shown below:

Column 3, line 67, "50" should appear --5.0--;

Claim 1, first and second lines after the formula, "-CH=$\lambda$CH-" should appear -- -CH=CH- --.

Signed and Sealed this twenty-third Day of March 1976

[SEAL]

Attest:

RUTH C. MASON
*Attesting Officer*

C. MARSHALL DANN
*Commissioner of Patents and Trademarks*